US008483660B2

(12) United States Patent
Bae et al.

(10) Patent No.: US 8,483,660 B2
(45) Date of Patent: Jul. 9, 2013

(54) ACCESS CONTROL METHOD USING FEMTO BASE STATION AND COMMUNICATION SYSTEM THEREFOR

(75) Inventors: Eun-Hui Bae, Seoul (KR); Chae-Gwon Lim, Seoul (KR); Tae-Sun Yeoum, Seoul (KR); Sung-Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 12/722,328

(22) Filed: Mar. 11, 2010

(65) Prior Publication Data

US 2010/0234023 A1    Sep. 16, 2010

(30) Foreign Application Priority Data

Mar. 11, 2009    (KR) .................. 10-2009-0020816

(51) Int. Cl.
*H04M 1/66*    (2006.01)
(52) U.S. Cl.
USPC ..... 455/411; 455/432.3; 455/433; 455/435.1; 455/552.1; 370/352; 370/356
(58) Field of Classification Search
USPC . 455/411, 432.3, 433, 435.1, 552.1; 370/352, 370/356
See application file for complete search history.

(56) References Cited

U.S. PATENT DOCUMENTS

| 2008/0259873 | A1 | 10/2008 | Ahmavaara et al. | |
| 2008/0285492 | A1 | 11/2008 | Vesterinen | |
| 2009/0215452 | A1* | 8/2009 | Balasubramanian et al. | 455/434 |
| 2009/0232019 | A1* | 9/2009 | Gupta et al. | 370/252 |
| 2012/0044908 | A1* | 2/2012 | Spinelli et al. | 370/331 |
| 2012/0071168 | A1* | 3/2012 | Tomici et al. | 455/445 |

FOREIGN PATENT DOCUMENTS

| WO | 2010-062095 A2 | 6/2010 |
| WO | 2010-098574 A2 | 9/2010 |

* cited by examiner

*Primary Examiner* — Temica M Beamer
(74) *Attorney, Agent, or Firm* — Jefferson IP Law, LLP

(57) ABSTRACT

A communication system including a femto base station and a method for controlling access of a User Equipment (UE) in the communication system are provided. The method includes receiving a service request message from the UE and transmitting the service request message to a core network entity within a core network, receiving, from the core network, UE information and Local BreakOut (LBO) service information regarding the UE which is used to provide an LBO service to the UE, and providing the LBO service to the UE using the received information. Thus, a core network controls access of the UE so that the UE can directly access an Internet network through the LBO.

16 Claims, 4 Drawing Sheets

ACCESS CONTROL METHOD USING FEMTO BASE STATION AND COMMUNICATION SYSTEM THEREFOR

PRIORITY

This application claims the benefit under 35 U.S.C. §119 (a) of a Korean patent application filed in the Korean Intellectual Property Office on Mar. 11, 2009 and assigned Serial No. 10-2009-0020816, the entire disclosure of which is hereby incorporated by reference.

BACKGROUND OF THE INVENTION

1. Field of the Invention

The present invention relates to a communication system including a femto base station. More particularly, the present invention relates to an access control method and a communication system therefor which provide a service for allowing a User Equipment (UE) to be directly connected to an Internet network through a femto Base Station (BS) without passing through an enterprise network.

2. Description of the Related Art

Initial mobile communication services were based on voice service. However, recently, the focus in the development of mobile communications technologies has shifted from voice service to data service. As a result of this shift, there has been an emergence of systems for providing high-speed data service, such as High-Speed Downlink Packet Access (HSDPA), mobile Worldwide Interoperability for Microwave Access (WiMAX), and the like.

The systems for providing such high-speed data service have a channel capacity of only a few Mbps. Accordingly, if too many User Equipments (UEs) located within a Base Station (BS) coverage area are using channels, data service speed of each UE drops to a few ten to a few hundred Kbps.

Various attempts to ensure data transmission speed of a few Mbps per UE have been made by installing a BS in a house or building interior to use fewer UEs. For example, a system using a femto BS, which is a BS installed interiorly, has been proposed to provide a service to approximately one to four UEs.

A femto BS is a type of micro BS which provides a communication service in an area having a radio of 100 meters or more. The femto BS is installed in an area, such as the interior of a house or building, where propagation of a macro cell is degraded, or in a shadow area, thereby compensating for quality of a communication service. The femto BS has low installation and maintenance costs by using a commercial Internet connection without passing through an indoor relay station. The femto BS also has superior mobility since it can be installed at any area where an Internet connection is provided.

Once installed, the femto BS increases data service capacity and coverage in a house or Small Office Home Office (SOHO) area. The femto BS, which has a small size, may limit connection only to UEs subscribed to an enterprise network to which the femto BS belongs. Currently, an access control technique for confirming whether a UE is permitted to access a specific femto BS has been discussed by standardization organizations, which are developing technical standards for femto BSs.

Meanwhile, a UE may access an Internet Protocol (IP) network through an enterprise network or may use a Local BreakOut (LBO) technique to directly access the IP network without accessing the IP network through an enterprise network. In order for a UE to receive an LBO service through a femto BS, the femto BS must perform additional access control to allow the UE to use the LBO service.

Therefore, a need exists for a method and communication system for allowing a UE direct access to an IP network.

SUMMARY OF THE INVENTION

An aspect of the present invention is to address at least the above-mentioned problems and/or disadvantages and to provide at least the advantages described below. Accordingly, an aspect of the present invention is to provide an access control method for providing a Local BreakOut (LBO) service and a communication system, which allow a User Equipment (UE) connected to a femto Base Station (BS) to directly access an Internet Protocol (IP) network without access through an enterprise network.

In accordance with an aspect of the present invention, a method for controlling access of a UE in a communication system including a femto BS and a core network is provided. The method includes receiving a service request message through the femto BS from the UE and searching for LBO service information regarding the UE, if the LBO service information regarding the UE has been found, determining whether an LBO service for the UE is permitted, and if the LBO service for the UE is permitted, transmitting, to the femto BS, at least one of UE information and the LBO service information which is used to provide the LBO service to the UE.

In accordance with another aspect of the present invention, a method for controlling access of a UE in a communication system including a femto BS and a core network is provided. The method includes receiving a service request message from the UE and transmitting the service request message to a core network entity within the core network, receiving, from the core network, at least one of UE information and LBO service information regarding the UE which is used to provide an LBO service to the UE, and providing the LBO service to the UE using the received information.

In accordance with a further aspect of the present invention, a communication system for controlling access of a UE is provided. The system includes a core network entity for receiving a service request message from the UE, for searching for LBO service information regarding the UE, determining whether an LBO service for the UE is permitted, and for transmitting UE information and the LBO service information which is used to provide the LBO service to the UE, and a femto BS connected between the core network entity and the UE, for receiving the service request message from the UE, for transmitting the service request message to the core network entity, for receiving, from the core network entity, at least one of the UE information and the LBO service information regarding the UE which is used to provide the LBO service to the UE, and for providing the LBO service to the UE using the received information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
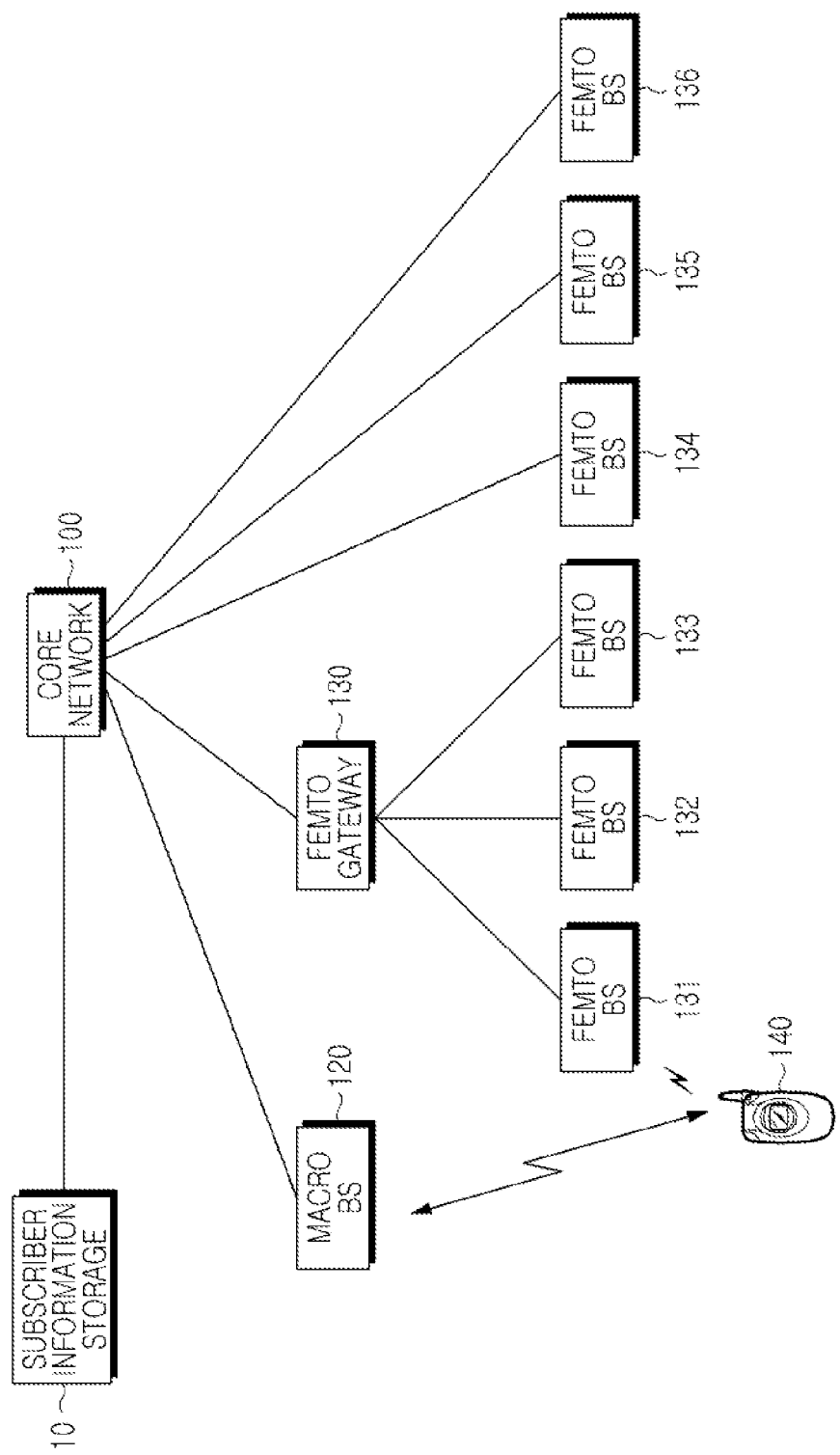
FIG. 1 is a diagram illustrating a configuration of a communication system including femto Base Stations (BSs) according to an exemplary embodiment of the present invention.

FIG. 1 is a diagram illustrating a configuration of a communication system including femto Base Stations (BSs) according to an exemplary embodiment of the present invention.

Referring to FIG. 1, a communication system includes a plurality of femto BSs 131 to 136 connected to a core network 100, a subscriber information storage 110 for storing information regarding a UE 140 subscribed to a femto BS, and a macro BS 120. The core network 100 may include entities, such as a Mobile Switching Center (MSC), a Serving General Packet Radio Services (GPRS) Support Node (SGSN), a Mobile Management Entity (MME), and the like. The subscriber information storage 110 may be a Home Subscriber Server (HSS) taking charge of Authentication, Authorization and Accounting (AAA) or may be a database operating additionally in an enterprise network for femto BS subscribers. The macro BS 120 indicates a general BS rather than a femto BS. The femto BSs may be directly connected to the core network 100 as indicated by reference numerals 134 to 136 or may be connected to the core network 100 through a femto gateway 130 as indicated by reference numerals 131 to 133. Each femto BS may satisfy a mobile communication standard of Wideband Code Division Multiple Access (WCDMA), Global System for Mobile telecommunication (GSM), CDMA2000 1x Evolution-Data Only (EV-DO), Long Term Evolution (LTE), and the like. For convenience, exemplary embodiments of the present invention will be described in the context of an LTE system as an example.

Figure 2:
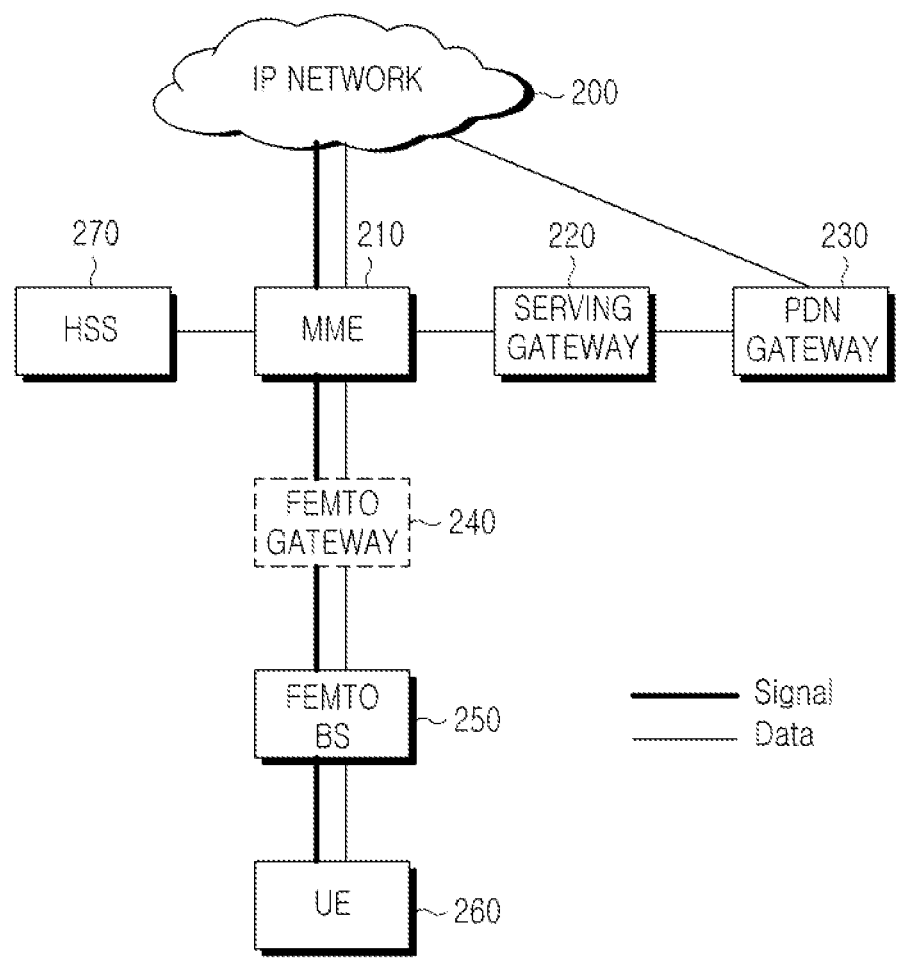
FIG. 2 is a diagram illustrating signal and data transmission paths in a communication system including a femto BS according to an exemplary embodiment of the present invention.

FIG. 2 is a diagram illustrating signal and data transmission paths in a communication system including a femto BS according to an exemplary embodiment of the present invention.

Referring to FIG. 2, a signal is transmitted and received through a path of a UE 260, a femto BS 250, a femto gateway 240, an MME 210, and an Internet Protocol (IP) network 200. Data is transmitted and received through a path of the UE 260, the femto BS 250, the femto gateway 240, the MME 210, a serving gateway 220, a Packet Data Network (PDN) gateway 230, and the IP network 200. The femto gateway 240 may be omitted. The serving gateway 220 buffers data transmitted in an idle mode as an anchor point and receives a paging request from the MME 210. The PDN gateway 230 stores subscriber information and routing information, such as a Gateway GPRS Support Node (GGSN).

A method for performing access control for a Local BreakOut (LBO) service through a core network according to an exemplary embodiment of the present invention will be described in more detail below.

In order for a UE to receive a service from a femto BS which supports an LBO service, access control is first performed to determine whether the UE is permitted to receive the LBO service through the femto BS. In an exemplary implementation, access control for the LBO service is performed through a core network while a UE of an idle mode state transitions to an active mode in order to request the femto BS to provide the LBO service. A result of the access control is transmitted to the femto BS. The femto BS then can trigger the LBO service for the UE.

Figure 3:
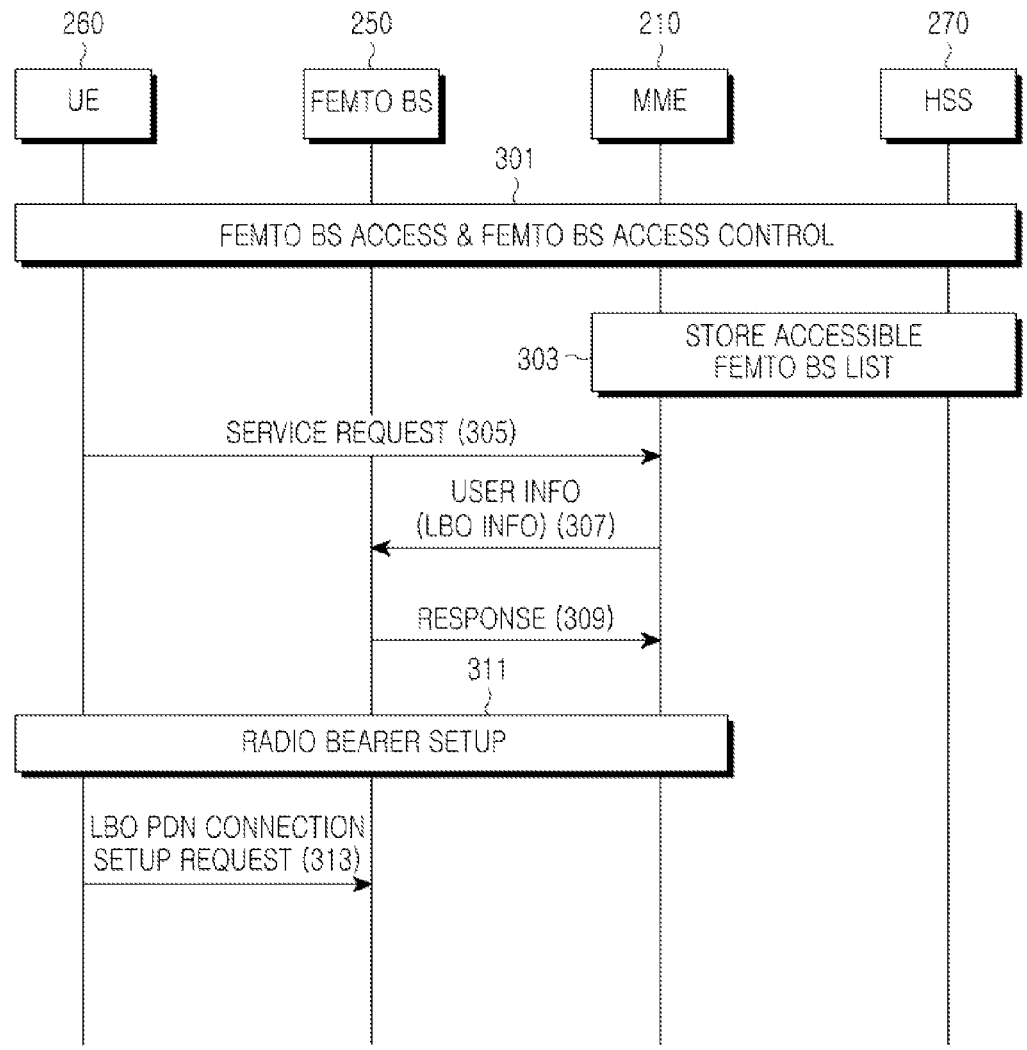
FIG. 3 is a diagram illustrating an access control procedure for a Local BreakOut (LBO) service through a core network according to an exemplary embodiment of the present invention.

FIG. 3 is a diagram illustrating an access control procedure for an LBO service through a core network according to an exemplary embodiment of the present invention. In the following description, the MME is described as performing access control of a UE. However, it should be noted that any entity within a core network according to an exemplary embodiment of the present invention may perform the access control of the UE.

Referring to FIG. 3, a UE 260 located in a macro BS searches an accessible femto BS 250 and performs a femto BS access procedure for moving to the femto BS 250 from the macro BS in step 301. In the above process, the UE 260 additionally performs a procedure for access control to determine whether an MME 210 permits the UE 260 to access the femto BS 250.

In an exemplary configuration of an enterprise network, if the femto BS 250 is connected to the MME 210 through a femto gateway, the femto gateway is positioned between the MME 210 and the UE 260 and processes signals.

In order to perform access control for a femto BS and access control for an LBO service, the MME 210 should have access to information regarding which femto BS the UE 260 can access and information regarding to which UE an LBO service is permitted. For convenience, it is assumed that this information is stored in the MME 210. However, this information may be stored separately from the MME 210. Accordingly, the MME 210 requests an HSS 270 to transmit a list of accessible femto BSs, and receives and stores the list in step 303. Accordingly, the MME 210 may make a request for access to the femto BS 250 connected by the UE 260 or a request for the LBO service. Alternatively, the HSS 270 may update information stored in the MME 210 whenever subscriber information stored in the HSS 270 is changed.

In step 305, the UE 260, which is connected to the femto BS 250 and is in an idle mode state, transmits a service request message for transitioning to an active state to the MME 210. The MME 210 which has received the service request message searches subscriber information (e.g., permanent identity or temporary identity) regarding the UE 260 which has transmitted the service request message. The MME 210 determines whether the UE 260, which has transmitted the service request message, has been subscribed to the LBO service from the information stored in step 303. If the UE 260 has been subscribed to the LBO service, the MME 210 determines how static Quality of Service (QoS) information for the LBO service has been set.

If it is permitted that the femto BS 250 provides the LBS service to the UE 260, which has transmitted the service request message, the MME 210 transmits a message for permitting the femto BS 250 to provide the LBO service to the UE 260 in step 307. This message may include at least one of UE information (i.e., a UE context and the like), indication information indicating that the LBO service is permitted, and LBO information (i.e., a QoS level while the LBO service is provided and the like).

In step 309, the femto BS 250 stores the UE information and LBO service related information, which is included in the message, received from the MME 210. The femto BS 250 then transmits a response message to the UE information and the LBO service related information to the MME 210.

In step 311, the UE 260, the femto BS 250 and the MME 210 set up a radio bearer for transmission and reception of data.

In step 313, the UE 260 requests the femto BS 250, which supports the LBO service, to set up connection for transmitting a packet traffic for the LBO service. The femto BS 250 which has received the connection setup request message determines whether to provide the LBO service to the UE 260 based on the LBO service related information received in steps 305 and 307. If the LBO service for the UE 260 is permitted, the femto BS 250 allocates an IP address for LBO packet traffic. LBO traffic data transmitted from the UE 260 to the femto BS 250 is transmitted to an external public Internet network by using the IP address.

Figure 4:
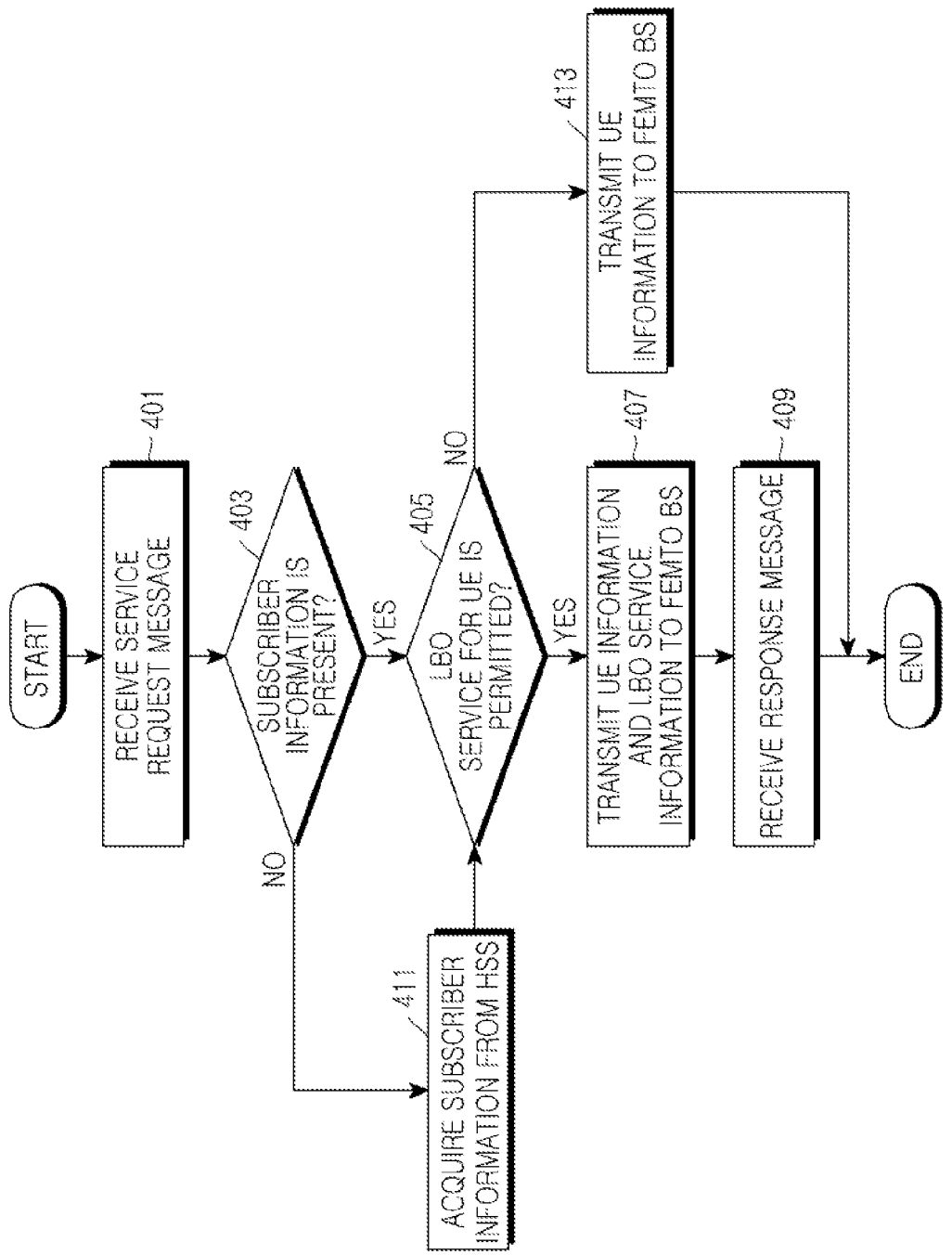
FIG. 4 is a flowchart illustrating an operation of a Mobile Management Entity (MME) for access control for an LBO service according to an exemplary embodiment of the present invention.

FIG. 4 is a flowchart illustrating an operation of an MME for access control for an LBO service according to an exemplary embodiment of the present invention.

Referring to FIG. 4, an MME 210 receives an LBO service request message from a UE 260 of an idle state in step 401.

The MME 210 confirms whether subscriber information related to a femto BS regarding the UE 260, which has requested the LBO service, has been stored in the MME 210 in step 403.

If the subscriber information has been stored, the MME 210 determines whether to permit the LBO service for the UE 260 in step 405. The determination may be made according to previously stored subscriber information, information regarding the femto BS 250 accessed by the UE 260, or an indication by an enterprise.

If the LBO service is permitted, the MME 210 transmits a message including UE information, such as a UE context, LBO service permission indication information and LBO information, such as a QoS level for data traffic while an LBO service is provided, to the femto BS 250 in step 407.

The MME 210 receives a response message to the transmitted information from the femto BS 250 in step 409. A radio bearer is established between the UE 260 and the femto BS 250. The LBO service is provided to the UE 260 through the femto BS 250. The UE 260 is able to access an IP network without passing through an enterprise network, such as a serving gateway or a PDN gateway.

Meanwhile, the MME 210 has no subscriber information related to the femto BS, the MME 210 requests the HSS 270 which has stored information regarding femto subscribers to transmit the subscriber information regarding the UE 260 and acquires the subscriber information in step 411 and determines whether to permit the LBO service for the UE 260 in step 405.

If the UE 260 is not permitted to receive the LBO service through the femto BS 250 in step 405, the MME 210 transmits UE information, except for the LBO service related information, to the femto BS 250 in step 413. The MME 210 receives a response message to the UE information in step 409 and ends an access control operation for the LBO service.

According to exemplary embodiments of the present invention, a UE may directly access an IP network without having to access the IP network through an enterprise network. Therefore, a data transmission speed may be raised and communication costs may be reduced.

While the invention has been shown and described with reference to certain exemplary embodiments thereof, it will be understood by those skilled in the art that various changes in form and details may be made therein without departing from the scope and spirit of the invention as defined by the appended claims and their equivalents.

What is claimed is:

1. A method for controlling access of a User Equipment (UE), by a Mobile Management Entity, in a communication system including a femto Base Station (BS), the method comprising:
    if the UE is connected to the femto BS, storing Local BreakOut (LBO) service information including information about UEs subscribed to an LBO service provided by the femto BS from a Home Subscriber Server (HSS);
    if a service request message of the UE through the femto BS is received, determining whether the UE has been subscribed to the LBO service from the LBO service information; and
    if the UE is subscribed to the LBO service, transmitting, to the femto BS, a message for permitting the femto BS to provide the LBO service to the UE,
    wherein the LBO service is provided to the UE, LBO traffic data transmitted from the UE is transmitted to an external public Internet network through the femto BS using an Internet Protocol (IP) address allocated by the femto BS.

2. The method of claim 1, wherein the LBO service information includes a list of femto BSs accessible by the UE.

3. The method of claim 1, further comprising:
    if a response of the message is received from the femto BS, establishing a radio bearer between the UE, the femto BS and the MME.

4. The method of claim 1, wherein the message includes at least one of indication information for indicating that the LBO service is permitted and a Quality of Service (QoS) level for the LBO service.

5. A Mobile Management Entity (MME) in a communication system including a femto Base Station (BS), wherein the MME comprises:

a controller for storing Local BreakOut (LBO) service information including information about User Equipment (UEs) subscribed to an LBO service provided by the femto BS from a Home Subscriber Server (HSS) if the UE is connected to the femto BS, determining whether the UE has been subscribed to the LBO service from the LBO service information if a service request message of the UE through the femto BS is received, if the UE is subscribed to the LBO service, controlling a transceiver transmitting, to the femto BS, a message for permitting the femto BS to provide the LBO service to the UE, wherein the LBO service is provided to the UE, LBO traffic data transmitted from the UE is transmitted to an external public Internet network through the femto BS using an Internet Protocol(IP) address allocated by the femto BS.

6. The MME of claim 5, wherein the LBO service information includes a list of femto BSs accessible to the UE.

7. The MME of claim 5, wherein if a response of the message is received from the femto BS, the controller establishes a radio bearer between the UE, the femto BS and the MME.

8. The MME of claim 5, wherein the message includes at least one of indication information for indicating that the LBO service is permitted and a Quality of Service (QoS) level for the LBO service.

9. A method for controlling access of a User Equipment (UE), by a femto Base Station (BS), in a communication system including the femto BS and the UE is connected to the femto BS, the method comprising:

receiving, from a Mobile Management Entity (MME), a message for permitting the femto BS to provide a Local BreakOut (LBO) service to the UE;

transmitting a response of the message to the MME, receiving a connection setup request for the LBO service from the UE after a radio bearer is established between the UE, the femto BS and the MME, and allocating an Internet Protocol (IP) address for traffic of the LBO service, and transmitting information of the IP address to the UE, wherein the LBO service is provided to the UE, the LBO traffic data transmitted from the UE is transmitted to an external public Internet network through the femto BS using the IP address.

10. The method of claim 9, wherein the message comprises at least one of indication information for indicating that the LBO service is permitted and a Quality of Service (QoS) level for the LBO service.

11. The method of claim 9, wherein the indication information is determined by LBO service information.

12. The method of claim 9, wherein the LBO service information is obtained by the MME from a Home Subscriber Server (HSS), and wherein the LBO service information includes a list of femto BSs accessible the UE and information about UEs subscribed to an LBO service provided the femto BS.

13. A femto Base Station (BS) for controlling access of a User Equipment (UE) in a communication system including the femto BS and the UE is connected to the femto BS, the femto BS comprising:

a transceiver for receiving, from a Mobile Management Entity (MME), a message for permitting the femto BS to provide a Local BreakOut (LBO) service to the UE, transmitting a response of the message to the MME, receiving a connection setup request for the LBO service from the UE after a radio bearer is established between the UE, the femto BS and the MME, and a controller for allocating an Internet Protocol (IP) address for traffic of the LBO service, and transmitting information of the IP address to the UE, wherein the LBO service is provided to the UE, the LBO traffic data transmitted from the UE is transmitted to an external public Internet network through the femto BS using the IP address.

14. The femto BS of claim 13, wherein the message comprises at least one of indication information for indicating that the LBO service is permitted and a Quality of Service (QoS) level for the LBO service.

15. The femto BS of claim 14, wherein the indication information is determined by LBO service information.

16. The femto BS of claim 13, wherein the LBO service information is obtained by the MME from a Home Subscriber Server (HSS), and wherein the LBO service information includes a list of femto BSs accessible the UE and information about UEs subscribed to an LBO service provided the femto BS.

* * * * *